Feb. 14, 1956        P. SPURLINO ET AL        2,734,743
            RECORD MEDIA FEEDING APPARATUS
Filed Dec. 30, 1950                      4 Sheets-Sheet 1
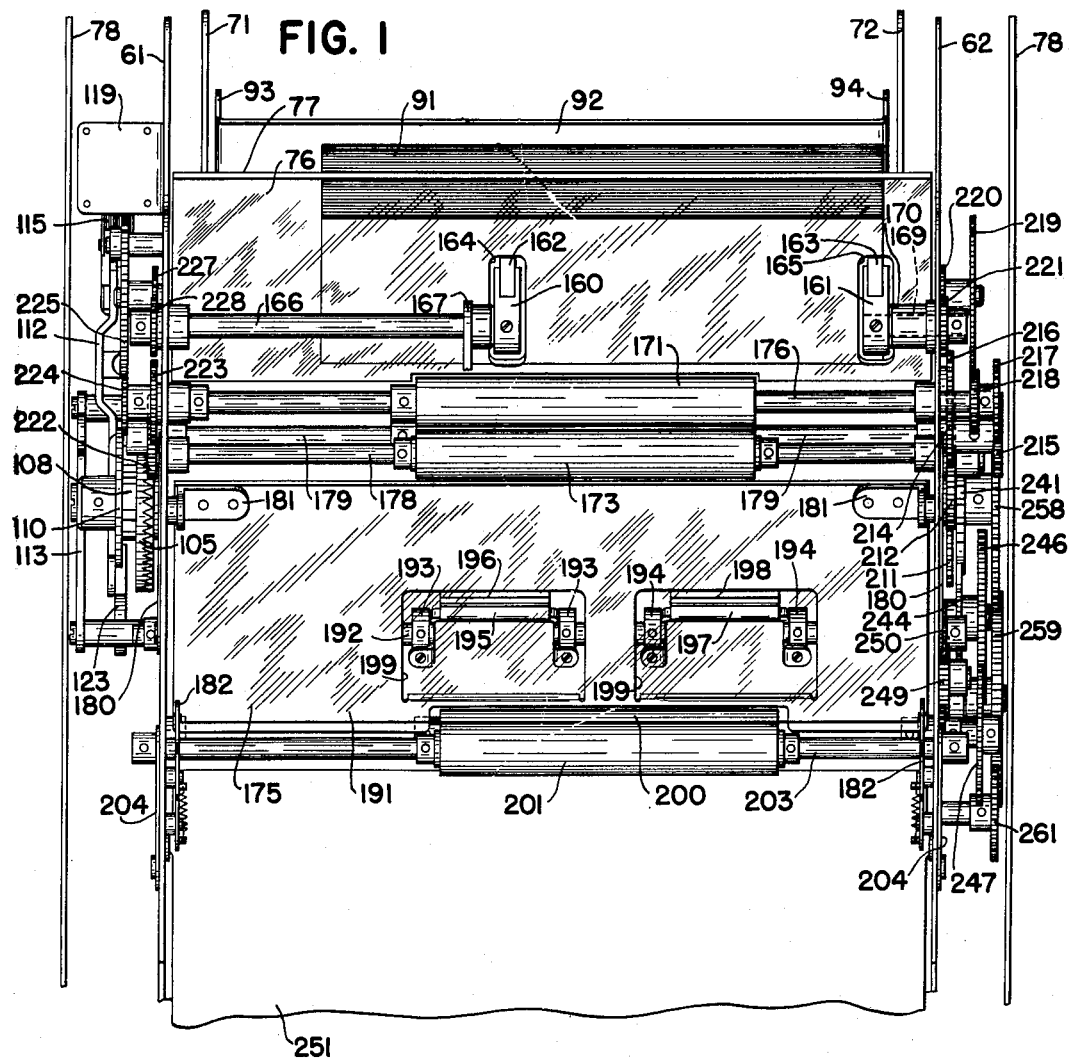
FIG. I
INVENTORS
PASCAL SPURLINO
WILLIAM C. BROWN
BY *Earl Benet*
*Ayres D. Stoddard*
THEIR ATTORNEYS

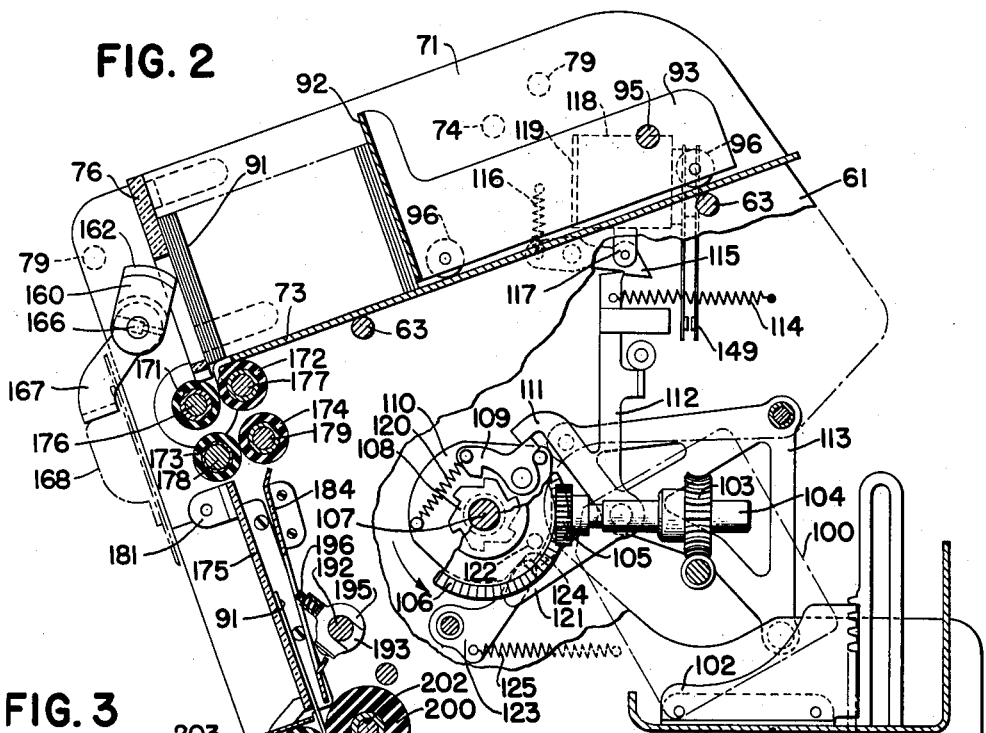
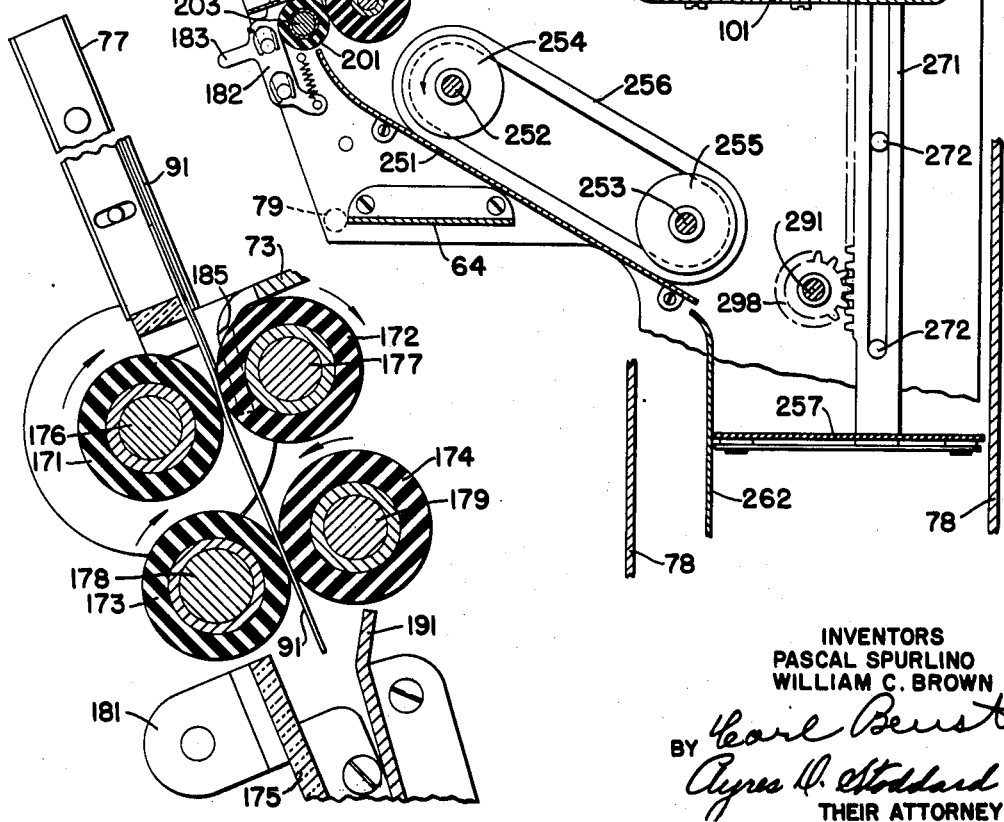

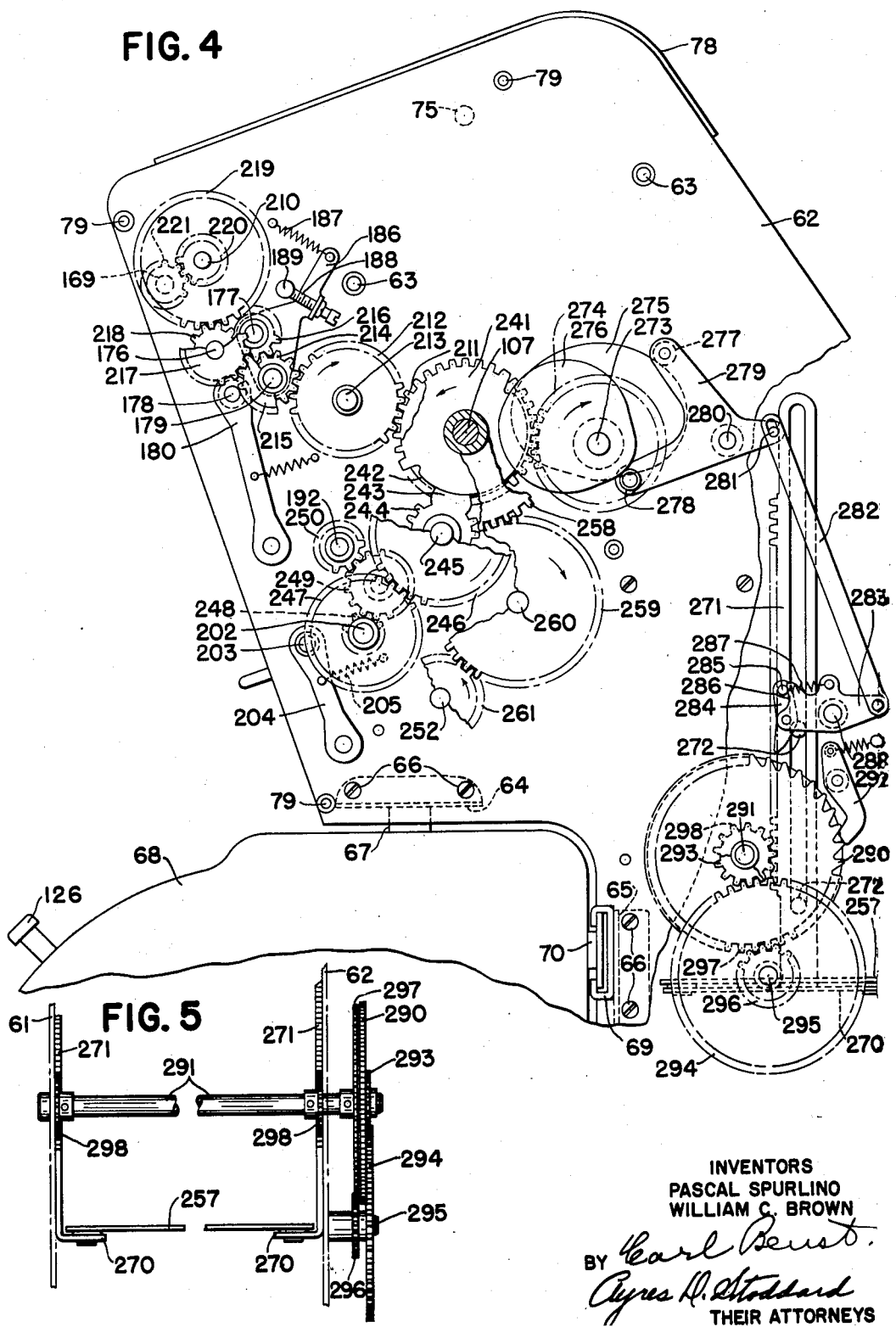

Feb. 14, 1956    P. SPURLINO ET AL    2,734,743
RECORD MEDIA FEEDING APPARATUS
Filed Dec. 30, 1950    4 Sheets-Sheet 4

INVENTORS
PASCAL SPURLINO
WILLIAM C. BROWN

BY *Carl Berst*
*Ayres D. Stoddard*
THEIR ATTORNEYS

United States Patent Office 2,734,743
Patented Feb. 14, 1956

2,734,743

RECORD MEDIA FEEDING APPARATUS

Pascal Spurlino and William C. Brown, Dayton, Ohio, assignors to The National Cash Register Company, Dayton, Ohio, a corporation of Maryland Application December 30, 1950, Serial No. 203,707

6 Claims. (Cl. 271—3)

This invention relates to an apparatus for feeding record material, such as cards or checks, one at a time, from an assemblage or stack of such cards or checks which is in such location as to make the face of the check visible in sufficient degree to identify the signature on the check and other pertinent information as to the proper account to which the check or card should be posted or charged. The foremost card is then fed into a position to completely expose the face of the card or check which has been fed from the stack. The check is moved from this last-mentioned position into a position where the leading or bottom edge of the check or card is engaged by a pair of feed rolls, whereupon the check is fed farther downward and afterwards gripped by a belt drive device which carries the check or card toward the back of the card box and deposits it face down upon an adjustable platform, upon which the cards or checks are thus stacked in the same order or sequence as they were when originally placed in the apparatus before being removed one at a time therefrom. This adjustable platform is moved downwardly a very slight amount substantially the amount of the thickness of a normal check each time a check is deposited thereon.

The purpose of having an adjustable platform to receive the inverted checks is to have the platform originally close to the end of the belt feed for the checks, so that the checks do not have so far to travel before reaching their permanent position, thus preventing fluttering and accidental turning over of the checks on their way from the belt to the platform.

This invention is well adapted for use in banks, in their posting departments, and particularly in connection with a posting machine of the type illustrated and described in the Spurlino et al. Patent No. 2,375,594. It is also well suited to be used on all types of media handling in connection with similar posting and statistical machines.

One of the old methods of handling checks in the posting departments of banks is for the operator to manually leaf through a pile or stack of checks and record the data from each check into the machine as she leafs through the stack.

By the use of the present invention, in connection with the posting of checks, much time and labor are saved, due to the fact that the checks are not individually handled after they are placed in the stack, but the stack is put into the apparatus and the first or foremost check of the stack is then fed into a position where the face of the check is fully exposed, so that the operator may read the amounts therefrom and may also read the maker of the check for posting purposes.

The apparatus is so connected to the machine that, when the operator strikes the machine release or motor key of the machine, after having posted the amount of the check, the depression of this motor key also causes the driving mechanism for the apparatus to function, to feed the second check down into a fully-exposed position and to simultaneously invert the first check that has been fed down, and cause it to be deposited face down onto the adjustable platform, as above mentioned.

This check-feeding device is provided with a particular type of feeding rolls at the top thereof, which rolls lie just beneath the leading or bottom edges of the foremost cards in the stack. This particular feeding device prevents more than one card from being ejected and fed into the reading position at any one time.

An alternate plan would be to have the feeding of the check caused by the depression of the first amount key, if so desired, in order to speed up the timing of the feeding of the checks relative to the posting of the data therefrom. As the checks are thus fed from the stack in the top portion of the apparatus, they are also automatically stacked on the movable platform in a receptacle in the same order or sequence in which they were when originally placed in the check-feeding apparatus.

The present invention has many advantages over other types of check-feeding mechanisms in that in the present invention it matters not whether the checks are all the same size, nor does it matter whether or not the checks are crumpled, as many of them are when they are returned to the banks for cancellation.

In certain other types of check-feeding mechanisms which are known as the "picker types," the checks must be fed one at a time by a "picker," which engages the top edge of the check and moves it downwardly. Many of the checks are what is known as "dog-eared," and, therefore, the picker mechanism does not always function properly, due to the bad edges of the checks.

The present apparatus feeds the check by contacting the face thereof and moving the check downwardly off the original stack, without in any way engaging the edge of the check. Moreover, the thickness of the check does not in any way interfere with the feeding of the checks from the stack, since here again the checks are fed from contact with the faces of the checks instead of contact with the edges of the checks.

Moreover, when the exposed check, after the amount has been posted therefrom, is fed from its exposed position into engagement with the lower feed rollers, here again the check is contacted, not on its edge, but on the back side thereof, so that here again there is no danger of the check's not being fed into the position to be engaged by the lower feed rollers and from thence to be engaged by the belt feed, whereupon the check is deposited on the adjustable platform.

This invention is an improvement over the invention illustrated and described in a co-pending application of Angus G. Helgeson, Serial No. 146,045, filed February 24, 1950, now Patent No. 2,696,688.

It is, therefore, an object of the present invention to provide an apparatus for feeding record media, such as cards or checks, one at a time, from a stack or an assemblage of such checks into a position to completely expose the face of the check which has been thus fed, and to thereafter provide positive feeding means for feeding this check from such exposed position and causing it to be deposited, face down, in a receptacle for such purpose.

It is another object of this invention to provide an apparatus for feeding checks by contact with the face of the check, to move the check from an assembly or stack of checks into a position to completely expose the face of the check and at the same time prevent an adjacent check from being fed into exposed position.

It is another object of the present invention to provide a movable platform to receive such checks after they have been fed from their exposed position into another stack.

Another object of the present invention is to provide gripping means for contacting the face of the first check of a stack of checks to feed said check from said stack downwardly into a position where the data thereon is exposed to view and then provide grippers to contact the back of said check to further feed said check from its exposed position into engagement with another feeding means, which causes said check to be deposited face down on a receptacle for such purpose.

A still further object of the present invention is to provide an adjustable platform or receptacle to receive checks as they are fed from an exposed position.

A still further object of the present invention is to provide a ratchet and gear feeding mechanism to move a check receptacle downwardly each time a check is deposited thereon, said check having been fed from a stack of checks.

With these and incidental objects in view, the invention includes certain novel features of construction and combinations of parts, a preferred form or embodiment of which is hereinafter described with reference to the drawings which accompany and form a part of this specification.

In said drawings:

Fig. 1 is a front elevation of the record media feeding apparatus.

Fig. 2 is a side elevation partly in section and partly broken away, showing the check-feeding means and the check platform operating means.

Fig. 3 is an enlarged detail view of a portion of the upper part of the check-feeding means.

Fig. 4 is a side elevation, partly in section and partly broken away, showing a portion of the gearing devices for driving the check-feeding rolls and also shows the movable check-receiving platform and means for moving the same one step each time a check is fed downwardly.

Fig. 5 is a detail view showing a portion of the gear and ratchet drive for the movable receiving platform for the checks.

*General description*

Figure 6:
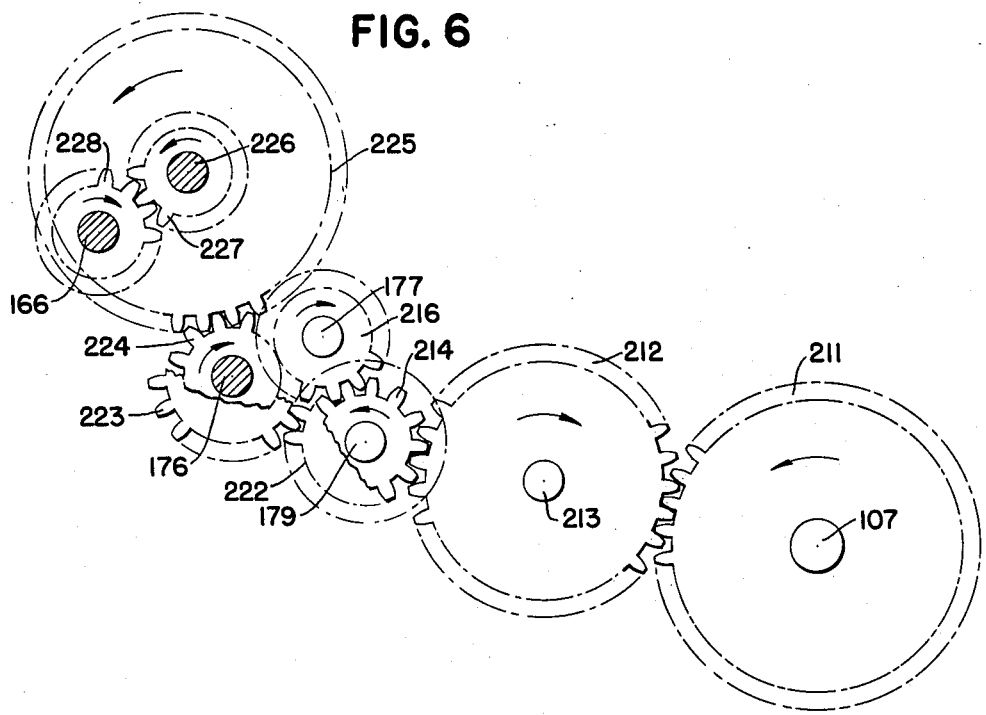
Fig. 6 is an enlarged view, partly in section, showing a portion of the driving mechanism for the feeding mechanism for the checks.

Described in general terms, the invention includes an apparatus for feeding record media, such as cards or checks, from a stack placed in a top compartment of the apparatus, with flexible means for feeding the foremost card or check from the stack into engagement with feeding rolls which further feed the check downwardly into a position to have the face thereof fully exposed so that, when used in connection with posting transactions in a bank, the operator can readily read the amount of the check and also the maker's name, for posting purposes.

In other words, as the checks are fed one at a time from the stack in the upper compartment of the apparatus, they are advanced so that the lower or leading edge thereof is gripped by feed rolls and deposited in a position so that the full face of the check is visible to the operator.

After the check has been posted and during the operation of feeding a second check from the stack, the first-fed check is gripped on the back thereof and lowered until its leading or lower edge is engaged by a pair of feed rollers, whereupon said check is fed further downwardly into engagement with a driving belt, which carries said check toward the rear of the apparatus and caused it to be deposited in a receptacle.

In this receptacle is a movable or adjustable platform onto which said checks are deposited face down, so that eventually, when the entire batch of checks has been fed from the upper part of the apparatus, they are stacked in the same sequence on the movable platform that they were in when they were stacked in the upper part of the apparatus.

The flexible feeding fingers, which feed the front check from the stack, the upper group of feed rollers, and the grippers which feed the exposed check from its exposed position downwardly into engagement with a second set of feed rollers are all driven from a common shaft through the medium of trains of gears. This common shaft also, through another train of gears, drives a belt device which engages the check after it has left the last pair of feed rollers and further feeds said check and causes it to be deposited onto a movable platform.

The apparatus shown in the present application is shown for illustrative purposes as being attached to the top of an accounting machine of the type illustrated in the above-mentioned Spurlino et al. Patent No. 2,375,594, which is a machine adapted for use in posting departments of banks.

After the amount of the check has been set up on the keyboard of the machine, the operator depresses a machine release key, which causes the machine to go through its normal operation, as fully illustrated and described in said patent. This motor-operating or machine-release key operates to close a switch in circuit with the motor, which drives the main drive shaft of the feeding apparatus.

This machine-release key also closes a circuit to operate a motor to drive the driving gear for operating the flexible feeding fingers, which feed the foremost check from the stack in the upper part of the apparatus, and, as above mentioned, also drives the feeding rollers and the belt drive mechanism.

Also operated by this motor is a shaft having a camming device, which operates a leverage to drive a ratchet and gear mechanism to lower the check-receiving platform in the receptacle one slight movement each time a check is fed from the stack in the upper part of the apparatus.

*Detailed description*

The apparatus for feeding record media, such as cards and checks, includes a left side frame 61 and a right side frame 62 (Figs. 1, 2, and 4), tied together near their tops by tie rods 63. Near the bottom and front parts of the side frames 61 and 62, they are tied together by a flanged plate 64. Near the bottom and toward the rear of the side frames 61 and 62, there is another tie plate 65. These tie plates 64 and 65 are held in position by screws 66, which are screwed into the flanges of the plates 64 and 65. The plate 64 has secured thereto two spacer blocks 67 (only one of which is shown), which rest on a cabinet 68 of the accounting machine with which the check feeding apparatus is used. The rear tie plate 65 has secured thereto a channel supporting bar 69, which fits over a T bar 70 supported by the cabinet 68.

Resting on the tie rods 63 is a check box, consisting of a left plate 71 and a right plate 72 (Fig. 1) integral with a base 73. The side plates 71 and 72 are secured to studs 74 and 75, carried by the side frames 61 and 62, respectively.

The front of the check box consists of a transparent plate 76 carried by two brackets 77 (one of which is shown in Fig. 3), which are in turn supported by the side frames 61 and 62.

A cabinet or cover 78, a part of which is shown in Figs. 1, 2, and 4, is used to cover the mechanism of the check-feeding apparatus and is held in place by cabinet studs 79 (Figs. 2 and 4) carried by the side frames 61 and 62.

In Fig. 2 there is shown a stack of checks 91, the front check of which is against the transparent plate 76. The checks are held in the stack close together by means of a pressure frame consisting of a front plate 92 and two side plates 93 and 94 (Figs. 1 and 2). The plates 93 and 94 are connected by a tie rod 95. This pressure frame carries rollers 96, which rest and roll on the bottom plate 73 of the check frame, and, as this frame is slanted toward the front, the pressure frame always applies pressure against the stack of checks 91 to hold them tightly against each other and to hold the front check against the inside face of the transparent plate 76.

Operating mechanism

All of the mechanism for removing the front check 91 from the stack of checks 91, shown in Fig. 2, and feeding that check downwardly and depositing it on the movable platform receptacle is operated by a motor 100, which is carried by a motor support frame 101, in turn carried by the side frames 61 and 62, and a motor support bracket 102. This motor 100, through a worm gear 103 and a shaft 104, drives a pinion 105, which in turn drives a gear 106 loose on a shaft 107. This direction of drive is counter-clockwise, as indicated by the arrow in Fig. 2. Secured to the gear 106 is a ratchet 108, adapted to cooperate with a pawl 109, carried by a plate 110, which is fastened to the shaft 107. The pawl 109 is held normally disengaged from the ratchet 108 by a finger 111 of a lever 112 pivoted on a bracket 113 supported by the side frame 61. A spring 114 normally tends to rock the lever 112 clockwise but is prevented from so doing by a latch 115 held in engagement therewith by a spring 116. The latch 115 is pivotally connected to a plunger 117 of a solenoid 118 carried on a bracket 119 supported by the side frame 61.

When the solenoid 118 is energized, it raises the plunger 117, thus releasing the latch 115 from the lever 112, whereupon the spring 114 moves the lever 112 clockwise, thus releasing the pawl 109 to the action of a spring 120, which rocks the pawl into engagement with the ratchet 108, whereupon the plate 110 is rotated counter-clockwise by the gear 106 and the ratchet 108 to drive the shaft 107.

Just before the end of the operation of the shaft 107, a finger 121, integral with the lever 112, is contacted by a pin 122 on the plate 110, which rocks the lever 112 counter-clockwise against the action of the spring 114 back to the position shown in Fig. 2, whereby the finger 111 will be placed in the path of the end of the pawl 109 and disengage said pawl from the ratchet 108, thus releasing the drive shaft 107 from the motor drive mechanism.

As the pawl 109 is disengaged from the ratchet 108, a retaining pawl 123 is moved into engagement with a notch 124 of the plate 110 by its spring 125, thus holding the shaft 107, the plate 110, and the pawl 109 in their normal positions and at the same time preventing a retrograde or clockwise back-lash movement of the plate 110.

When checks are posted and when the herein-described check-feeding apparatus is used in connection with a posting machine such as that, for example, shown in the above-mentioned Spurlino et al. Patent No. 2,375,594, the operator depresses a check key 126, shown in Fig. 4 and shown diagrammatically in Fig. 7. Such a check key is what is known in the art as a machine release key. It is, therefore, upon depression of this key 126 that the machine is released and the circuit to the motor 100 is closed through the operation of the solenoid 118, the circuit to which is partly closed upon the depression of the check key 126 and is completed immediately after the beginning of the operation of a main operating shaft 127 (Fig. 7), when a pin 128 on a gear or disk 129 rocks a lever 130 counter-clockwise against the action of its spring 131, causing the lever to close a switch 132, thus completing the circuit which was partially completed upon the depression of the check key 126, which closed a switch 133.

Figure 7:
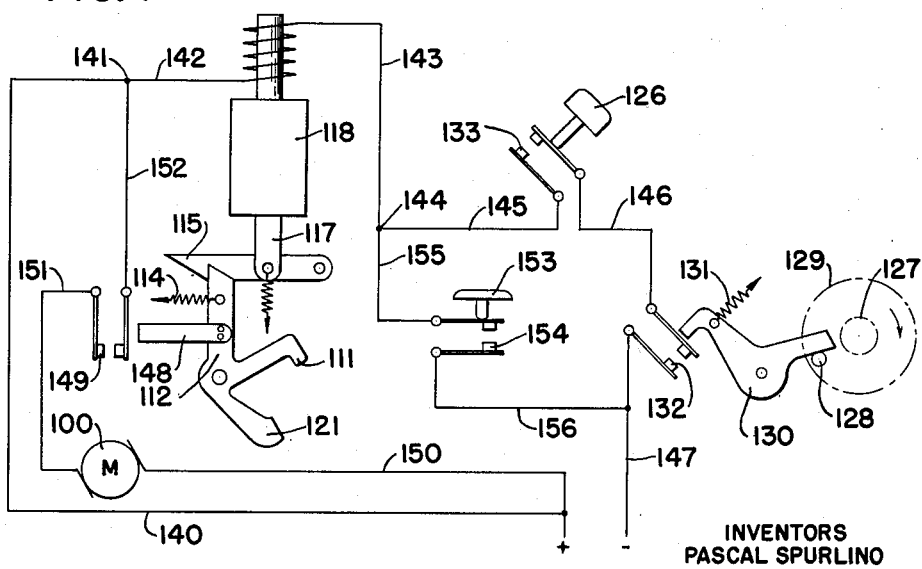
Fig. 7 is a wiring diagram showing the means for initiating movement of the motor for driving the check-feeding means and the electrical circuits therefor.

After the stud 128 passes the right end of a lever 130, the spring 131 rocks the lever 130 back into the position shown in Fig. 7, thus causing the switch 132 to open again.

Motor release circuits

The circuit through the motor 100 and through the solenoid 118 is shown in Fig. 7 and is as follows:

From the plus side of the line through line 140 to point 141, line 142, solenoid 118, line 143 to point 144, line 145 through closed switch 133, line 146 through closed switch 132, to the negative line 147.

The closing of the two switches 133 and 132 completes a circuit and energizes the solenoid 118, which, as previously described, releases the latch 115 from the lever 112, whereupon the spring 114 rocks the lever 112 counter-clockwise as viewed in Fig. 7, causing a finger 148 on the arm to close a switch 149. The closing of this switch 149 completes a circuit to the motor 100 as follows: From the plus side of the line through line 150, motor 100, line 151, closed switch 149, and line 152 to point 141; thence over line 142, solenoid 118, lines 143 and 145, switch 133, line 146, switch 132, to the negative line 147.

Should the operator wish, for example, to eject more than one of the checks 91, or wish to eject the front check from the stack, without operating the machine, there is provided a button 153 mounted on the front of the machine. Depression of this button 153 closes a switch 154, thus completing the circuit from the positive side of the line through lines 140, 142, solenoid 118, line 143, to point 144, thence over line 155 through closed switch 154, line 156, to the negative line 147.

The depression of this button 153 and the closing of the circuit through the switch 154 cause the energization of the solenoid 118, so that it releases the lever 112, whereupon it, through its spring 114, closes the switch 149, which completes the circuit through the motor 100, so that the feeding apparatus may be operated to feed the checks one at a time, and as many as the operator desires, from the stack of checks 91.

Upper feeding mechanism

Cooperating with the front check 91 of the stack of checks shown in Figs. 1 and 2 are two feeding arms 160 and 161, which carry soft pliable feeding fingers 162 and 163, respectively, which project through openings 164 and 165 in the transparent plate 76. In the illustrated form, these feeding arms 161 and associated pliable feeding fingers are driven in synchronism from separate sources, which in turn are operated by a common drive mechanism to be described later. However, it is to be understood that these two feeding fingers 162 and 163 may, if desired, be both driven from the same common shaft; that is, they may both be secured to one shaft, and one driving mechanism may be used to operate them both.

The feeding arm 160 is secured to a shaft 166, which is supported in the left side frame 61 and a bracket 167, which in turn is mounted on a lamp housing 168, shown in dot-and-dash lines in Fig. 2, to house lamps so that the front of the check stack may be illuminated to assist the operator. The feed arm 161 is secured to a shaft 169 (Figs. 1 and 4), which is supported by a hub bearing 170 carried by the side frame 62.

By means to be described hereinafter, the shaft 166 and the shaft 169 are driven in a clockwise rotation, as shown in Figs. 2 and 4, for each operation of the motor 100.

During such rotation, the soft pliable feeding fingers 162 and 163 contact the face of the front check in the stack of checks 91 and feed said check downwardly, as shown in Fig. 3.

In its downward movement, the check 91 is passed between rolls 171 and 172 (Fig. 3). The roll 171 is driven in a clockwise direction and the roll 172 is driven in a clockwise direction, the purpose of which will be explained hereinafter. The check is then passed between a pair of feed rolls 173 and 174. The roll 173 is driven clockwise and the roll 174 is driven counter-clockwise, so that the check 91 is fed farther downward and out of these rolls and deposited behind a transparent plate 175.

The rolls 171, 173, and 174 are secured to shafts 176, 178, and 179, respectively, all of which are supported in the two side frames 61 and 62. The roll 172 is secured to a shaft 177, supported by a pair of arms 186 (only one of which is shown, Fig. 4). These arms 186 are pivoted on the shaft 179, one arm 186 being adjacent each of the side frames 61 and 62. A spring 187, connected to each arm 186, holds an adjusting screw 188 in a flange of each arm against a stop stud 189 to maintain the roll 172 the proper distance from the roll 171 to always insure that, should a second check 91 start down with the feed of the first or front check, said second check will not pass between the rolls 171 and 172. This, as has been mentioned above, is due to the fact that the roll 172 is turned clockwise, thus preventing a second check from passing downward between the rolls 171 and 172.

The roll 173, which is a tension roll, and the shaft 178 are carried by a pair of arms 180 (Figs. 1 and 4), one of which is pivoted on the frame 61 and the other of which is pivoted on the frame 62. Each of the arms 180 has connected thereto a spring which holds the tension roll 173 in constant contact with the roll 174, which is positively driven by means to be hereinafter described, so that, when the check 91 is fed downwardly between the two rolls 173 and 174, the positive driving of the roll 174, combined with the tension roll 173, will feed the check farther downwardly, as above mentioned, and cause it to be deposited behind the transparent plate or window 175.

This window 175 is carried by a pair of brackets 181, one of which is pivoted on the frame 61 and the other of which is pivoted on the frame 62, as shown in Fig. 1. Contacting the bottom corners of the window 175 is a pair of spring retaining arms 182, which normally hold the window 175 in the position shown in Fig. 2.

Should the operator wish to move the window 175 outwardly for any reason at all, all that it is necessary for him to do is to press on fingers 183 on the retaining pawls 182 and move the pawls outwardly away from the bottom corners of the window 175.

A check guide 184 is mounted between the frames 61 and 62 and supported by those frames to prevent the check from falling backward away from the window 175.

From the above description, it can be seen that, as the front check is fed from the stack 91 downwardly, the positive driving of the roll 174 in cooperation with the tension roll 173 will cause the check to be fed downwardly and deposited behind the window 175.

To prevent two checks from being fed downwardly and deposited behind the window 175, the roller 172, as above described, is positively driven in a clockwise direction, as viewed in Figs. 2 and 3, as is the roller 171. This always insures that only one check will be fed down at a time, so that there can be no error in the posting of checks. In other words, a check will not be missed by having two checks go down, one directly behind the other, so that the back one, if one did go down, would be missed by the operator. The base of the check box 173 is provided with a downwardly bent ledge 185, which prevents any checks from getting back of the roller 172.

*Lower feeding mechanism*

After the check 91, which has been fed to a position behind the window 175, as shown in Fig. 2, has been posted, another feeding mechanism feeds the check from such position downwardly into a position to be engaged by an ejecting mechanism to be described hereinafter. This lower check feeding mechanism will now be described.

Rotatably supported by the frames 61 and 62 are two pairs of arms 193 and 194 (Figs. 1 and 2). Secured to the pair of arms 193 is a yoke member 195, carrying a long flexible feed finger 196. Secured to the pair of arms 194 is a yoke member 197, carrying a long flexible feed finger 198. The yokes 195 and 197 and the feed fingers 196 and 198 project through openings 199 in the guide plate 184.

By means to be described hereinafter, the shaft 192 is given one complete counter-clockwise rotation, as viewed in Fig. 2, each time the motor 160 is operated. During this movement of the shaft 192, the fingers 196 and 198 press against the back of the check which has been deposited behind the window 175 and feed the check downwardly, so that it is gripped by and between a feed roll 200 and a tension roll 201. The feed roll is secured to a shaft 202, which is supported by the side frames 61 and 62. The tension roll 201 is mounted on a shaft 203 carried by a pair of arms 204 (Figs. 1 and 4) pivoted on the frames 61 and 62. Each arm 204 has connected thereto a spring 205, which holds a roller 201 in constant engagement with the feed roll 200.

When the front check 91 is released the feed rolls 173 and 174, it drops down until its leading edge rests on the rolls 200 and 201, as shown in Fig. 2. The roll 200 is driven in synchronism with the rotation of the shaft 192, so that, as the check is moved between the roll 200 and the tension roll 201 by the fingers 196 and 198, said check is fed downwardly into a position to be engaged by an ejecting mechanism to be described later.

*Upper feed driving means*

The means for driving the feeding fingers 162 and 163, and the rolls 171, 172, and 174, will now be described.

Referring to Figs. 1, 4, and 6, there is secured to the drive shaft 107 a gear 211 meshing with a gear 212 mounted on a stud 213 carried by the side frame 62. This gear 212 meshes with a gear 214, which is connected to a gear 215. The gears 214 and 215 are both secured to the feed roll shaft 179. Thus, through the train of gears thus far described, the shaft 179 and the feed roll 174 are rotated counter-clockwise. The gear 214 meshes with a gear 216 secured to the shaft 177, which carries the reversing or back-up roll 172, so as to drive this roll clockwise as viewed in Figs. 2 and 3.

The gear 215 meshes with a gear 217 secured to the drive shaft 176 of the roll 171, thus driving this roll in a clockwise direction. Also secured to the shaft 176 is a gear 218, meshing with a gear 219, which is secured to a pinion 220, meshing with a pinion 221 secured to the finger shaft 169, which, it will be remembered, also has secured to it the finger arm 161. Thus, this shaft 169 and the finger 163 are driven in a clockwise direction. The gear 219 and the pinion 220 are mounted on a stud 210 on the side frame 62.

When the finger 163 and its shaft 169 are driven clockwise in the manner just described, the finger 164 and the shaft 166 (Figs. 1 and 6) are driven clockwise in absolute synchronism with the finger 163 by the following mechanism:

The feed roller 171 is also driven in synchronism by the same mechanism, now to be described. On the left end of the feed roll shaft 179 (Figs. 1 and 6) is secured a gear 222, meshing with the gear 223, which is secured to the feed roll shaft 176. Fastened to this gear 223 is a pinion 224, meshing with a gear 225, mounted on a stud 226, carried by the left side frame 61. Secured to the gear 225 is a pinion 227, meshing with a pinion 228, which is secured to the finger drive shaft 166.

This train of gears just described drives the shaft 166 in a clockwise direction, as viewed in Figs. 2 and 6, so as to turn the feeding finger 162 clockwise in absolute synchronism with the turning of the feeding finger 163, so that the front check 91 from the stack of checks will be fed downwardly from the stack into a position behind the window 175. When the check is in this position, its leading edge is resting against the feed roll 200, and its associated tension roll 201, as viewed in Fig. 2, as above described.

From the above description, it can be seen that, when the shaft 107 is operated by the motor 100 in the manner previously described, the shaft 179 is driven counter-clockwise, as viewed in Figs. 3, 4, and 6, the shaft 176 is driven clockwise, and the two feed fingers 163 and 164 are operated in a clockwise direction to feed the check from the stack 91 down into a position behind the window 175, as shown in Fig. 2. At the same time, the back-up feed roll shaft 177 is rotated clockwise to prevent a second check from being moved downwardly between the feed roll 174 and its cooperating tension roll 173 in the manner previously described.

Lower feed drive

While the shaft 107 is driving the upper feed rolls and feed fingers in the manner above described, it also drives the lower feed fingers 196 and 198 (Figs. 1 and 2) and also the feed roller 200. This drive mechanism is initiated from the shaft 107 through a Geneva gear drive which will be presently described. The purpose of the Geneva drive is to have the feed roll 200 and its associated tension roll 201 stationary at the time the check 91 reaches the position behind the window 175.

It is very necessary, of course, that the rolls 200 and 201 be not moving at the time the check 91 reaches the position where the leading edge thereof is against said rolls, and, as above mentioned, in order to achieve this result, the drive for the rolls 200 is accomplished through an intermittent or Geneva gear driving mechanism which will now be described.

Secured to the drive shaft 107 (Figs. 1 and 4) is a Geneva gear 241, having an intermittent surface 242, which is normally contacted by the perimeter of a large tooth 243 of a Geneva pinion 244 carried on a stud 245 in the side frame 62. Connected to the Geneva pinion 244 is a gear 246 meshing with a gear 247 secured to the feed roll drive shaft 202.

Thus, the drive shaft 107, through the Geneva or intermittent gear drive, operates the feed roll 200 to feed the check 91 from the position shown in Fig. 2 behind the window 175 downwardly between the feed rollers 200 and 201 into position to be picked up by an ejecting mechanism later described.

In order to positively insure that the check is gripped between the feed roll 200 and its tension roll 201, there is provided a pair of feeding fingers 196 and 198, which have been previously described, and the drive for these feeding fingers is as follows:

Also secured to the feed roll shaft 202 is a pinion 248, meshing with a gear 249, mounted on a stud carried by the frame 62. This gear 249 meshes with a pinion 250, which is secured to the shaft 192, which, it will be remembered, has secured to it both of the feeding fingers 196 and 198.

These feeding fingers 196 and 198 are, of course, driven synchronously with the feed rolls 200 and 201, so as to positively insure that the check is fed from the position behind the window 175 in Fig. 2 downwardly, so that it will definitely be gripped by the feed roll 200 and its tension roll 201.

Card ejecting means

As the check 91 leaves the feed roll 200 and 201, it is engaged by an ejecting mechanism which carries it farther on down and deposits it on a movable platform receptacle.

Mounted between and secured to the side frames 61 and 62, below the feed roll 200 and 201, is a guide plate 251 (Fig. 2). Mounted in the side frames 61 and 62 are shafts 252 and 253. Secured to the shaft 252 are two pulleys 254 (only one of which is shown in Fig. 2). Secured to the shaft 253 are pulleys 255 (only one of which is shown in Fig. 2). Connecting each pair of pulleys 254 and 255 is a belt 256, only one of which is shown. The bottoms of these belts contact the upper surface of the guide plate 251. The shaft 252 is driven counter-clockwise by means to be described hereinafter, and therefore, when the check 91 is fed downwardly by the rolls 200 and 201, its leading edge is picked up by the belts 256 and fed on downwardly and deposited face down on a movable receptacle platform 257.

Card ejecting drive

The shaft 252 is rotated counter-clockwise by the following means. Connected to the previously-described gear 241 (Fig. 4), which, it will be recalled, is secured to the drive shaft 107, is a gear 258 meshing with a gear 259 mounted on a stud 260 carried by the side frame 62. The gear 259 meshes with a gear 261 secured to the shaft 252.

Therefore, when the shaft 107 is driven counter-clockwise by the motor 100, the gears 258, 259, and 261 rotate the shaft 252 counter-clockwise, thus driving the belt 256 to eject the check 91 after its leading edge has been fed downwardly by the feed rolls 200 and 201. The plate 251 and the belts 256 are so located that, as the top edge of the check leaves the belts, the check is then in a position directly above a movable platform 257, and said check therefore drops down onto said platform.

Platform receptacle

The platform receptacle 257 for receiving the checks after they have been ejected by the belts 256 is mounted to move downwardly in a receptacle formed by the cabinet 78 of the feeding apparatus in the lower rear part thereof, as shown particularly in Fig. 2.

The platfrom 257 is secured to bent-over ears 270 (Figs. 4 and 5) of racks 271 that are mounted one just inside the side frame 61 and the other just inside the side frame 62 to slide on studs 272 carried by the side frames 61 and 62.

Platform feed and operating mechanism

Normally, at the beginning of the posting of several stacks of checks, the platform 257 is in its upper or raised position, shown in Figs. 2 and 4. Each time a check is deposited thereon, or, in other words, each time the shaft 107 is driven by the motor 100, the platform 257 is lowered a very small amount substantially the thickness of the check which has been deposited thereon.

The mechanism for moving this platform 257 downwardly will now be described. Mounted on a stud 273 (Fig. 4) carried by the side frame 62 is a gear 274, which meshes with the previously-described gear 211, which, it will be recalled, is secured to and driven by the operating shaft 107.

Connected to the gear 274 is a pair of plate cams 275 and 276 cooperating with rollers 277 and 278, respectively, carried on a lever 279 pivoted on a stud 280 carried by the side frame 62. Connected to the lever 279 by a pin-and-slot connection 281 is a link 282, which is pivoted to a pawl-operating arm 283, pivoted on a stud 288 carried by the side frame 62. This pawl arm 283 has pivoted thereto a feed pawl 284, having a stud 285 normally held against a shoulder 286 of the arm 283 by a spring 287. This pawl 284 is adapted to cooperate with a feed ratchet 290, which is mounted to turn on a shaft 291 carried by the side frames 61 and 62.

Clockwise movement of the cams 275 and 276, as shown by the arrow in Fig. 4, rocks the lever 279 first counter-clockwise and then clockwise. The counter-clockwise movement of the lever 279 raises the link 282 and rocks the pawl arm 283 counter-clockwise, whereupon the feed pawl 284 engages the feed ratchet 290 and turns this ratchet one step of movement in a clockwise direction. As the lever 279 returns clockwise to its normal position, the link 282 rocks the arm 283 clockwise and raises the pawl 284 back into the position shown in Fig. 4. A spring-operated retaining pawl 292 prevents retrograde movement of the ratchet 290.

Secured to the side of the ratchet 290 (Figs. 4 and 5) is a pinion 293 meshing with a gear 294 mounted to turn on the stud 295 carried by the side frame 62. Secured to the gear 295 is a pinion 296, which meshes with a gear 297 secured to the previously-described shaft 291. Also secured to the shaft 291 are two pinions 298, one of which meshes with each of the racks 271.

As the ratchet 290 is moved a step of movement in a clockwise direction, it will, through the train of gears just described, turn the shaft 291 a very slight distance in a clockwise direction, which, through the gears 298, will lower the racks 271 and consequently the receptacle platform 257 a very short distance in a downward direction.

Thus, as each check is deposited face down on the platform 257, the latter is lowered a very short distance, so that the checks always have to drop only a short distance after leaving the guide plate 251 and the driving belts 256, so there is no chance for the checks to flutter and become crosswise or turned over in their movement from the belts to the platform 257.

Consequently, when the checks are removed from the platform, they are in the identical order in which they were stacked in the check compartment at the top of the check feeding apparatus.

*Operation*

Briefly described, the operation of the above-described check-feeding apparatus is as follows: When the person gets ready to post a batch of checks, she will stack those checks, as shown in Fig. 2, with the front check against the transparent plate 76, the check holder frame plate 92 being against the last check, thus holding the checks together in a compact stack. The next operation is to depress the key 153 (Fig. 7), which initiates an operation of the motor 100 to drive the check-feeding fingers 162 and 163, so that the front check will be fed downwardly into a position to be fed still farther by the feeding rolls 174 and 173 and deposited in the position shown in Fig. 2, behind the window 175. The check is now in position to be posted, and the operator reads the proper amounts from the check and sets them up on the keyboard and finally depresses the check key 126 of the machine.

The depression of this key, as described, initiates another operation of the motor 100, thus causing the driving of the check-feeding fingers 196 and 198 to feed the check from the position behind the window 175 so that it will be gripped by the feed rolls 200 and 201, which are being turned at this time so as to move the check downwardly onto the plate 251, whereupon it is gripped by the pair of belts 256, fed downwardly, and finally ejected and allowed to come to rest on the receptacle platform 257 in an inverted position. During this operation, a second check is fed from the stack 91 downwardly into a position to be gripped by the feed rolls 173 and 174 and finally deposited in the position shown in Fig. 2, behind the window 175. During the feeding of these rollers 173 and 179, the rollers 200 and 201 are not moving, due to the intermittent Geneva gear drive shown in Fig. 4, which has been previously described. These rollers are standing still at that time, so that the check 91 will remain in the position shown in Fig. 2, behind the window 175, ready for the posting.

During the operation, after the check has been deposited on the platform 257, the cams 275 drive the feed pawl 284, as previously described, which in turn operates the feed ratchet 290, and this, through the train of gears to which it is connected, lowers the racks 271 a very slight distance to lower the table 257 a corresponding amount.

While the form of mechanism herein shown and described is admirably adapted to fulfill the objects primarily stated, it is to be understood that it is not intended to confine the invention to the one form or embodiment herein disclosed, for it is susceptible of other embodiments in various forms.

What is claimed is:

1. In an apparatus of the class described, adapted to be actuated in timed relationship with and under control of an accounting posting machine; a machine release key to initiate a machine operation; a power means to actuate said apparatus and rendered effective upon operation of said accounting machine to drive a plurality of feeding means for removing the front media of a stack of media and causing the same to be engaged by one of said feeding means and fed downwardly and deposited into a position to have data posted therefrom; a member to prevent more than one of said media from being removed from said stack of media upon each operation of said feeding mechanism; another of said feeding means engaging the check on the back side thereof and causing it to be fed further downwardly and engaged by another feeding means to continue the feed of the check and move it into a position to be engaged by a pair of ejecting belts; means for driving the ejecting belts; means for intermittently driving the feeding means which grips the back of the check and the third-mentioned feeding means; a common operating means to drive the first two mentioned feeding means and the intermittent feeding means drive; a movable platform receptacle to receive the record media after it has been ejected by said driving belts; a pair of racks connected to said platform; a reduction gear device to drive said racks downwardly each time a check is deposited thereon; a ratchet and pawl mechanism to operate said reduction gears; a camming device to drive said ratchet and pawl mechanism; and means connected to the camming device and operated by the common driving mechanism to drive said cams.

2. In an apparatus of the class described, adapted to be actuated in timed relationship with and under control of an accounting machine; a machine release key to initiate an operation of said accounting machine; a power means operable by said accounting machine after its operation has been initiated by said machine release key to actuate said apparatus feeding fingers for removing a record media from a stack of such media; means for driving one of said fingers; means for driving another of said fingers; a common operating means for both of said driving means; feed rolls to feed the record media after it has been removed from said stack, said feed rolls causing said record media to be deposited in a position to expose the face of said media whereby the data thereon may be read, said feed rolls being operated by said common operating means; a rotatable member intermediate said stack of media and said first-mentioned feed rollers to prevent more than one record media from being removed from said stack by the feeding fingers upon each operation of said fingers; other feeding rolls to further feed said media; other feeding fingers to remove said media from said position and cause the media to be gripped and fed by said other feeding rolls; an intermittent drive means operated by said common operating means to drive said other feed rolls; feeding means to engage said media, as it is fed by said other feed rolls, and feed the media and eject the same, thereby causing it to be deposited face down on a movable receptacle; means intermediate said feeding means and said common operating means and operated by the latter to drive said feeding means; and means for operating said movable receptacle each time a media is deposited thereon.

3. In an apparatus of the class described, adapted to be used with and operated in timed relationship with an accounting machine, and under control thereof; means operable during each operation of said accounting machine for removing a record media from a stack of such media; means for depositing the removed record media in a position of accessibility for posting therefrom; means to cause said deposited media to be retained in said position until an immediate subsequent operation of the machine; means for preventing the removal of more than one record media from said stack of media; means operable during said subsequent operation of the accounting machine for engaging the back side of the media to remove said record media from said retained position; means for engaging the leading end of said media as it is removed from said position, and feeding the media into cooperative position with another feeding means to further feed said media and cause the media to be deposited face down on a movable platform; and means for moving said platform downwardly during said subsequent operation of the machine, as the media is deposited thereon.

4. In an apparatus of the class described, operated in timed relationship with and under control of an accounting machine; a machine release key for said accounting machine; means operable during operation of said accounting machine when released by said key for removing a record media from a stack of such media; means for depositing the removed record media into a position of accessibility for posting therefrom during the next succeeding operation of the accounting machine; means to cause the deposited media to remain in said position until the next operation of the machine; means for preventing the removal of more than one record media from said stack of media; means operable during said next operation of the machine for engaging the back side of the media to remove said record media from said position; a pair of feed rollers to engage the leading edge of said media as it is removed from said position during said subsequent operation of the machine to further feed said media; a belt feeding device to engage the leading end of said media as it is being fed by said pair of feed rollers, and feed the media still further and cause it to be deposited face down on a platform; and means for moving said platform downwardly during the operation of the feeding of the media and the depositing of the same on said platform during said subsequent operation of the accounting machine.

5. In an apparatus of the class described, adapted to be actuated in timed relationship with and under control of an accounting machine to feed the record media into a position accessible for posting therefrom; a plurality of feeding means operable during one operation of the accounting machine to remove a record media from a stack of such media, deposit the removed media in a position of rest for posting purposes during the next subsequent operation of the accounting machine, then feed it further onward during said subsequent operation of the accounting machine, and finally eject it and cause it, during said subsequent operation of the accounting machine to be deposited on a platform to receive such media in inverted order whereby the upper or original stack of media is eventually deposited in the same order on the movable platform; means for driving a certain plurality of said feeding devices; means for driving another of said feeding devices intermittently, causing the same to stop at a definite time in the operation, to stop the feed of the check or the media for posting purposes; means to lower the receptacle platform; and means, including a cam, bell crank, link and ratchet device, intermediate said platform and said main driving means for operating the platform lowering means during said subsequent operation of the machine.

6. In an apparatus of the class described, adapted to be actuated in timed relationship with and under control of an accounting machine constructed for bank posting operations; a machine release key to initiate a machine operation of said bank posting machine; a power means rendered effective upon operation of said accounting machine; a plurality of feeding means actuated by said power means during the operation of the accounting machine to remove a record media from a stack of such media, and feed said media into a certain position, cause the media to remain in that position until the amounts thereon are posted therefrom in and by said accounting machine; then operating one of said feeding means to feed said media from said stationary posting position during a subsequent operation of the machine and cause it to be deposited face down on a movable receptacle; a reduction gear train to operate said platform to lower the same; a ratchet and pawl mechanism to drive said gear train; a cam device to operate said ratchet and pawl device; and a common driving means to operate all of said feeding means and said ratchet and pawl driving means during the operation of the accounting posting machine.

References Cited in the file of this patent
UNITED STATES PATENTS

| | | |
|---|---|---|
| 1,743,158 | Morse | Jan. 14, 1930 |
| 1,855,638 | Lane | Apr. 26, 1932 |
| 2,027,797 | Toppin | Jan. 14, 1936 |
| 2,080,968 | Krell | May 18, 1937 |
| 2,135,090 | Milmoe | Nov. 1, 1938 |
| 2,178,879 | Mikes | Nov. 7, 1939 |
| 2,223,334 | Robison | Nov. 26, 1940 |
| 2,237,874 | Braun | Apr. 8, 1941 |
| 2,288,520 | Geller | June 30, 1942 |
| 2,377,525 | Schutt | June 5, 1945 |
| 2,393,254 | Leiffer | Jan. 22, 1946 |
| 2,412,246 | Blumenstein | Dec. 10, 1946 |
| 2,443,281 | Terry | June 15, 1948 |
| 2,472,931 | Yohn | June 14, 1949 |
| 2,597,973 | Christian | May 27, 1952 |